Nov. 10, 1964  
J. G. ANDERSON ETAL  
3,156,866  
METHOD AND MEANS FOR INDICATING THE MODE  
OF FAILURE OF INSULATORS  
Filed March 22, 1961  
4 Sheets-Sheet 2

Inventors,  
John G. Anderson,  
Remo U. Giacomoni,  
by Gilbert P. Tarleton  
Their Attorney.

Nov. 10, 1964 J. G. ANDERSON ETAL 3,156,866
METHOD AND MEANS FOR INDICATING THE MODE
OF FAILURE OF INSULATORS
Filed March 22, 1961 4 Sheets-Sheet 3

Inventors,
John G. Anderson,
Remo U. Giacomoni,
by Gilbert P. Tarlton
Their Attorney.

Inventors,
John G. Anderson,
Remo U. Giacomoni,
by Gilbert P. Tarleton
Their Attorney.

United States Patent Office 3,156,866
Patented Nov. 10, 1964

3,156,866
METHOD AND MEANS FOR INDICATING THE MODE OF FAILURE OF INSULATORS
John G. Anderson, Dalton, Mass., and Remo U. Giacononi, Milan, Italy, assignors to General Electric Company, a corporation of New York
Filed Mar. 22, 1961, Ser. No. 97,514
5 Claims. (Cl. 324—72)

This invention relates to an improved method and means for indicating the mode of failure of insulators from which electrical power transmission lines are suspended.

Electrical power transmission lines are commonly suspended from grounded metal towers by means of non-conducting insulator assemblies such as those disclosed in U.S. Patents 2,587,587 and 2,598,460, which are assigned to the same assignee as this invention. The insulators are designed to prevent electrical current from the transmission lines from flowing to their supporting metallic towers. When a current flows between the transmission line and the grounded tower across the insulator, the phenomena may be a relatively short duration spark, or a relatively long duration arc; such phenomena are referred to in the art as a "flash-over." When a flash-over occurs it will damage the exterior surface of the insulator and thus leave a visible indication that a flash-over has occurred. The damage to the insulator may be a carbon deposit or other discoloration, or the flash-over may craze, chip, or otherwise break the insulator.

Power transmission systems, including the insulators, are designed to prevent flash-over not only during normal transmission of power, but also during transient voltage surges caused, for example, by lightning striking the transmission line or the tower, or surges caused by switching of apparatus connected to the transmission line. It is desirable to construct transmission systems so that flash-overs will not occur because flash-overs often result in damage to some element in the transmission system that requires an interruption in the transmission of power. It is necessary to determine the cause of a flash-over before a power transmission system can be modified to prevent future flash-overs. For example, if the flash-over occurred because of lightning striking a transmission line conductor, a redesign of the overhead shielding wire system would be required. On the other hand, if the flash-over occurred because of lightning striking the grounded tower or the overhead shielding wire, a reduction in tower height or a decrease in the footing resistance of the tower would improve the system. Further, flash-over caused by low frequency power transmission voltages (i.e. 60 c.p.s.) could be corrected by the cleaning of the insulator, increasing of the insulator length, or by modifying the insulator design. Prior to our invention, the determination of why a flash-over occurred required the use of expensive and complicated equipment.

Accordingly, it is an object of our invention to provide an improved method and means for determining the cause of breakdown of an insulator from which an electric power transmission line is suspended.

A further object of our invention is to provide an inexpensive yet rugged device for determining the mode of failure of an insulator.

A still further object of our invention is to provide an integral device for producing a voltage discharge (e.g. Lichtenberg pattern) that indicates the polarity of random transient voltages.

Other objects and advantages of our invention will become apparent from examination of the specification, drawing, and claims, and the scope of the invention will be pointed out in the claims.

Briefly stated, according to one aspect of our invention, the mode of failure of an insulator of the type employed to suspend an electric power transmission line from a grounded tower can be determined by the use of means that produces an electric impulse when a steep wave front voltage surge, such as a lightning stroke, causes flash-over across the insulator. The impulse producing means may be connected to means for producing an image that indicates the direction of movement of the steep wave front voltage surge.

In the drawing:

in FIG. 5a the parts are shown assembled; and in FIGS. 5b, 5c, and 5d the respective parts are individually shown disassembled to reveal their interior and exterior construction.

Figure 1:
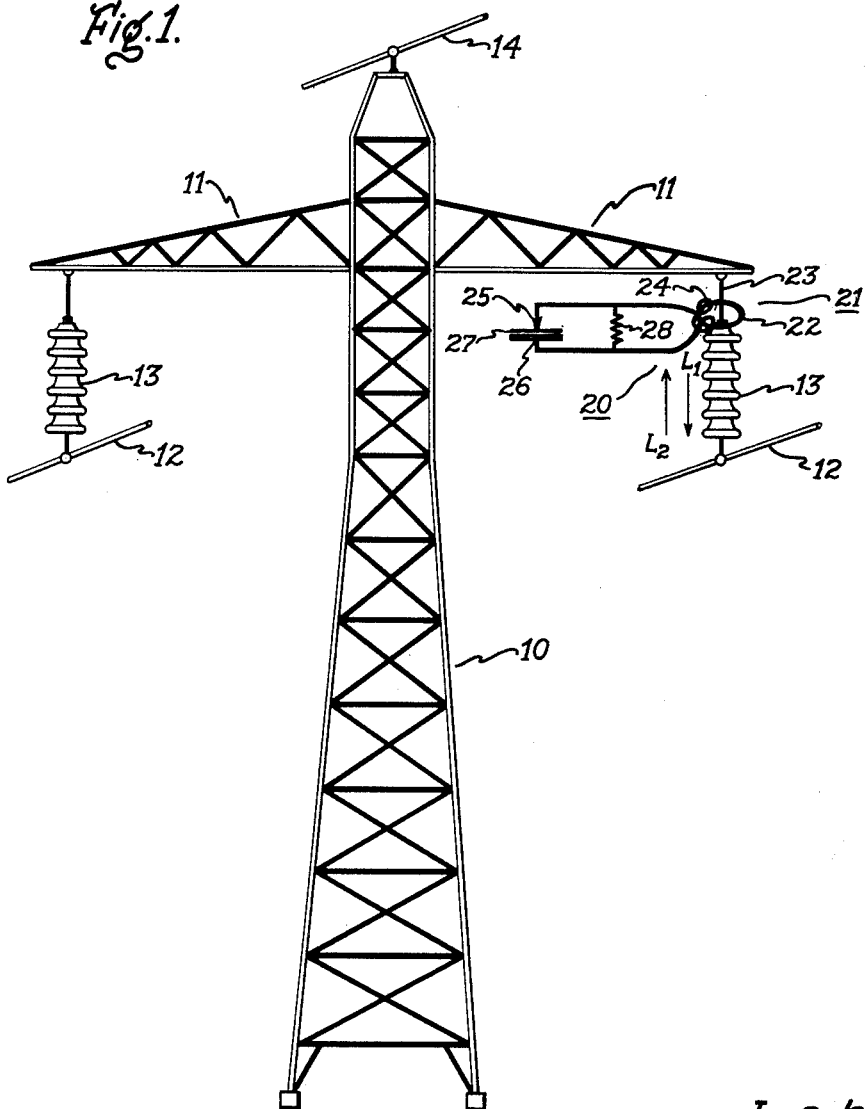
FIGURE 1 is a schematic representation of a power transmission system employing the teachings of our invention.

The invention will now be explained by reference to the drawing. An electric power transmission system may comprise a metallic tower 10 supported by and grounded to the earth. The tower 10 may have one or more arms 11 extending therefrom, and an electrical conductor 12 for carrying one phase of the electric power being transmitted by the system may be suspended from the arms 11 by elongate suspension insulators 13 of conventional construction. The power transmission system may employ an overhead shielding wire 14 grounded to the tower 10 according to conventional practice.

The power transmission system may be provided with an indicator 20 for indicating the mode of failure of an insulator 13 in accord with our invention. The mode of failure indicator employs an impulse current transformer 21 for producing an electric impulse when a transient, steep wave front voltage surge, such as a lightning stroke, causes flash-over across the insulator. The impulse current transformer 21 may comprise a toroidal magnetic core 22 coaxially surrounding a conventional metallic rod 23 connecting the insulator 13 to the arm 11. A winding 24 may be coiled around the core 22; the winding 24 may be connected at one end to a point electrode 25 and at the other end to a metal plate 26. An image recording medium 27, such as photographic film, may be employed between the plate 26 and electrode 25 for recording an impression, such as a Lichtenberg figure, that will indicate the relative magnitude and polarity of the transient voltage wave. The polarity of the image will indicate the direction of movement of the flash-over causing, steep wave front surge, as will be explained in detail in paragraphs that follow. The winding 24 has connected across it a resistor 28 for integrating the open-circuit output voltage of winding 24 and thus converting this voltage into a voltage form nearly proportional to the amplitude of flash-over current flowing through insulator cap 30 and supporting element 23. This output voltage is made sufficient to produce a voltage discharge on the recording medium 27.

Figure 2:
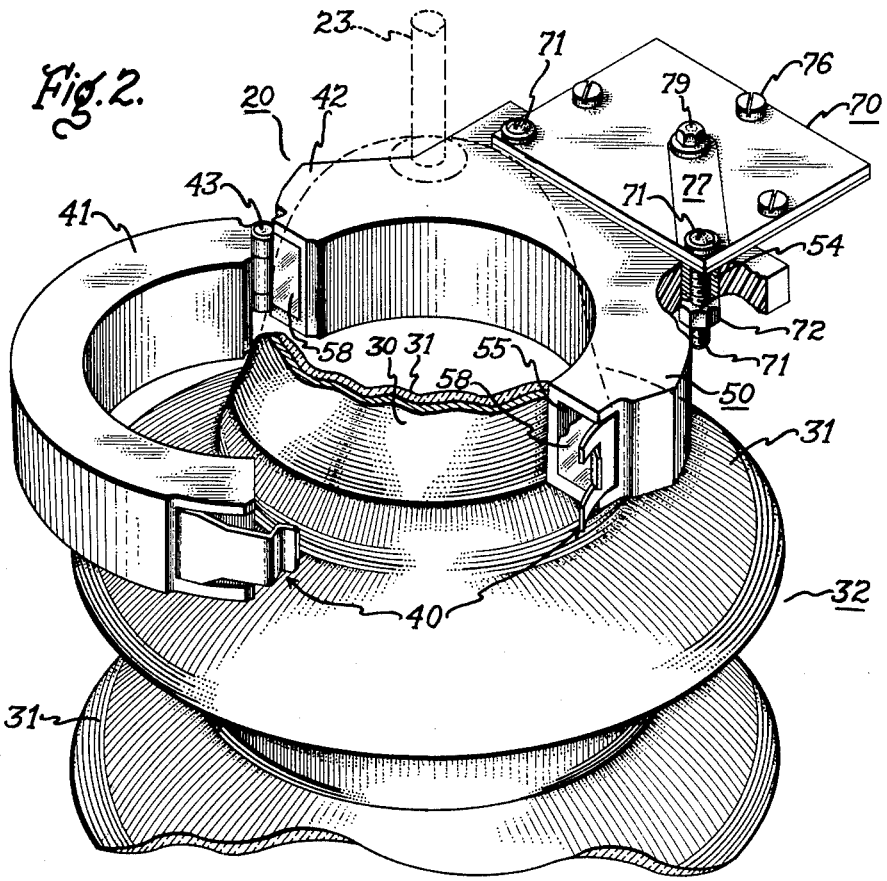
FIGURE 2 is a perspective partially broken away view of a mode of failure indicator in open position and an insulator with which the indicator is associated.
Figure 3:
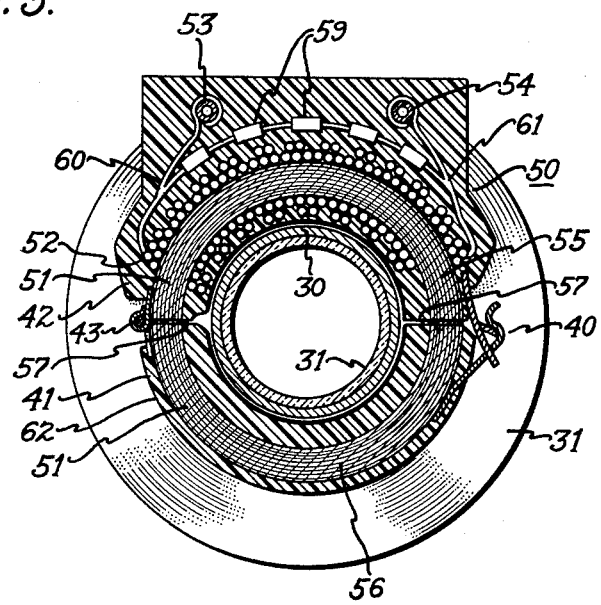
FIGURE 3 is a top plan cross-sectional view on a reduced scale of the mode of failure indicator and insulator of FIG. 2, showing the indicator in closed position around the insulator.

Referring now to FIGURES 2 and 3, an embodiment of a commercial mode of failure indicator 20 in accord with the teachings of our invention will now be described. The mode of failure indicator shown in FIGURES 2 and 3 is of such a size that it can circumscribe and will rest upon a metal cap 30 of the type conventionally employed on the uppermost porcelain shell 31 of a conventional transmission line suspending insulator assembly 32. The cap 30 may be attached to a metallic element 23 which in turn is attached to an arm (not illustrated) of a transmission line tower. The mode of failure indicator 20 is placed on the insulator by pivoting two-core portions 41 and 42 relative to each other, and engaging a fastening means 40 of any conventional structure. The portions 41 and 42 are pivotally connected to each other by means of a conventional pintle and eye type of hinge 43.

The mode of failure indicator 20 comprises an inductor 50 for producing an electric impulse when a steep wave front surge causes flash-over across the insulator 32. A recording image-producing device 70 is connected to the inductor 50. The device 70 responds to steep wave front transient voltage surges to produce and record a permanent image indicative of the polarity and magnitude of the voltage surge. The inductor 50 comprises a toroidal core 51 made from a wound strip of thin magnetic material. The core 51 is surrounded by a winding 52, and the winding 52 has a pair of terminals 53 and 54. The core 51 is divided into two abutting halves 55 and 56. The core halves 55 and 56 are separated by gaps 57 at their abutting interfaces for the purpose of filtering-out or blocking low frequency voltages, as will be explained in paragraphs that follow. The gaps 57 may be maintained at a predetermined dimension by affixing a film of nonconducting material 58 to the faces of the core half 55. Resistance means comprising a plurality of serially connected resistors 59 may be connected across leads 60 and 61 connecting the ends of the winding 52 to the respective terminals 53 and 54. The core 51, winding 52, leads 60 and 61, terminals 53 and 54, and resistors 59 are encapsulated in a suitable insulating molding material 62, such as an epoxy resin. Electrical connection to the winding 52 is obtained by making contact with the terminals 53 and 54, which may be sleeves of conducting material such as brass.

The recording device 70 is electrically connected to the sleeve terminals 53 and 54 of the winding 52 by means of brass bolts 71 which pass through and are in contact with the terminals, as shown in FIGURE 2. The bolts 71 have nuts 72 threaded on the ends thereof for removably holding the device 70 on the inductor 50.

Figure 5:
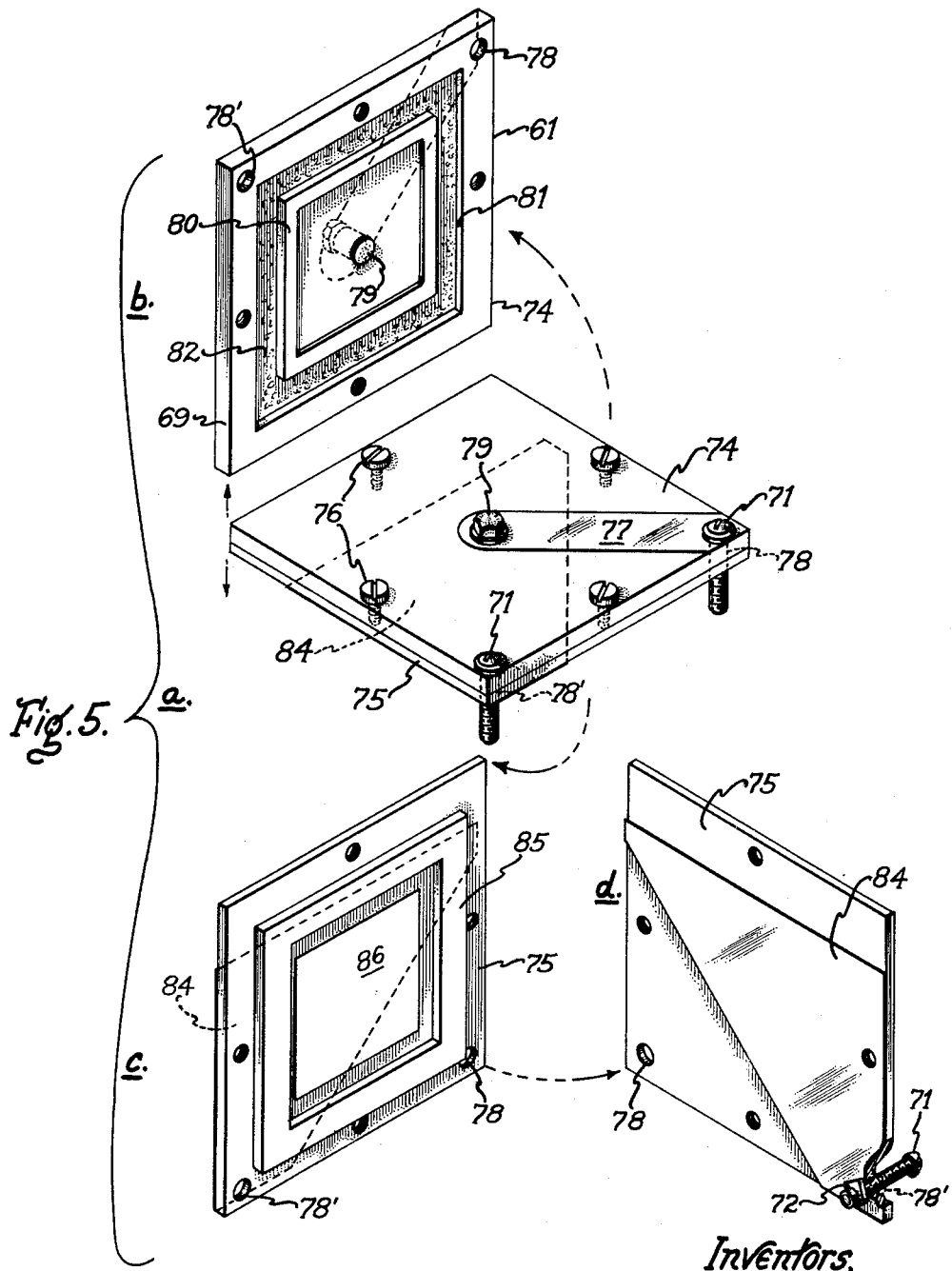
FIGURE 5 is a perspective view of a discharge pattern recording means.

Referring now to FIGURE 5a, the device 70 is seen to comprise an upper body portion 74 and a lower body portion 75 which form a light-proof receptacle for holding photographic film. The body portions 74 and 75 are made of insulating material and are attached to each other by means of nonconducting screws 76. The upper portion 74 has conducting means, such as a strip of metal foil 77, extending from a hole 78. Electrical connection between the terminal 54 and the foil 77 is made by one of the bolts 71. The foil 77 is in contact with a point electrode 79, which may be a bolt that extends into the interior of the film holding receptacle at approximately the center thereof. Referring to FIGURE 5b, the interior face of the portion 74 is provided with ridges 80 and 81, and a layer of felt 82 is interposed between the ridges 80 and 81 for preventing the entrance of light which would expose the photographic film.

The lower body portion 75 of device 70 has a plate electrode 84 on the exterior thereof. As shown in FIGURE 5d, a portion of the plate 84 extends around a hole 78' through which the other bolt 71 extends. A nut 72 on the bolt 71 contacts the plate 84 and thus provides an electrical connection to the other end of the winding 52 through the sleeve terminal 53. The conducting parts 77, 79 and 84 on the device 70, connected to different ends of the winding 52, must be separated as much as possible by insulating material in order to ensure that an electrical discharge can occur only between the point electrode 79 and the plate electrode 84. Therefore, the plate electrode 84 does not extend very far beyond the center of the body portion 75 in the direction of the hole 78, through which electrical contact between the conducting strip 77 and the terminal 54 is maintained by a bolt 71. As shown in FIGURE 5c, the body portion 75 has an upstanding ridge 85 which is located and proportioned for telescopically mating between the upstanding ridges 80 and 81 on the portion 74 to ensure that the chamber for enclosing photographic film 86 is lightproof.

It will be appreciated by those skilled in the art that discharge pattern forming mediums other than photographic film may also be employed for recording a permanent image of the electrical impulse. For example, in U.S. Patent 2,929,672, which is assigned to the same assignee as this invention, equally acceptable image producing and recording means employing an insulating semi-solid material such as silicone grease are disclosed.

Figure 4:
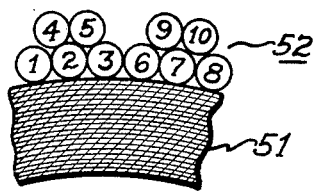
FIGURE 4 is a schematic cross-sectional representation on an enlarged scale of the windings of a mode of failure indicating device, showing how the conductor layers are transposed.

FIGURE 4 is a schematic representation of the manner in which the winding 52 may be constructed to satisfactorily distribute the voltage impulse produced by a steep wave front, transient voltage surge. The winding 52 may be formed from adjacent groups of conductor turns coiled around the core 51. As indicated by the numbers on the turns in FIGURE 4, one group of turns has three consecutive conductor turns 1, 2, and 3 which are wound on the core 51, and then two turns 4 and 5 are "thrown back" over the previously wound turns. The next group of turns also has three consecutive turns 6, 7, and 8 wound on the core 51, and then the next two turns 9 and 10 are "thrown back" over their associated three turns. This procedure of winding groups of turns is continued until the winding is completed with the total number of turns required.

In an actual embodiment of a mode of failure indicator produced for commercial purposes, three hundred and twenty-five turns were wound around a core, such as 51, in the manner described with reference to FIGURE 4. The core was a wound strip of magnetic steel, and had an outside diameter of approximately 5 inches and a substantially rectangular cross-section of approximately one inch by one-half inch. A gap of approximately .014 inch was maintained at both of the interfaces of the core halves by affixing mylar plastic tape thereto. The winding was made from No. 27 insulated copper wire, and five resistors, such as 59, each having a resistance of 47 ohms were connected in series across the terminals of the winding. The core, winding, resistors, and terminals were encapsulated in epoxy resin.

Referring again to FIGURE 1, the operation of mode of failure indicating means in accord with our teachings will now be explained. When a flash-over occurs across the insulator 13, current will flow through the metallic connector element 23 between the transmission line conductor 12 and the grounded tower 10. When the frequency of the current flowing through the connector 23 is above a predetermined value, the magnetic core 22 will be excited. This will induce a voltage in the winding 24. The voltage drop across the resistance 28 will produce a potential difference proportional to the current through connector 23 between the point electrode 25 and the plate 26. This will cause an electric discharge to take place that will produce an image on the recording medium 27. The size and shape of the image will reveal the polarity and relative magnitude of the voltage surge that caused the insulator 13 to flash-over. Although the description of operation has been made with reference to FIGURE 1, it is to be understood that the specific embodiment shown in FIGS. 2–5 functions in the same manner.

Figure 6:
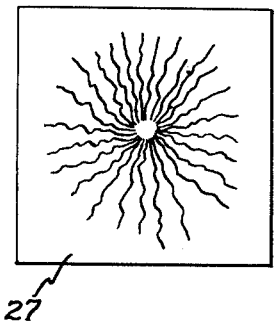
FIGURE 6 is a representation of a positive Lichtenberg figure.
Figure 7:
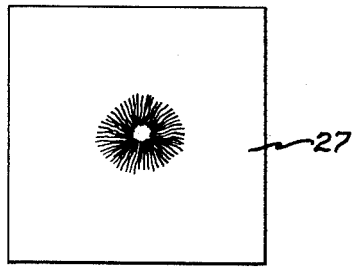
FIGURE 7 is a representation of a negative Lichtenberg figure.

It has been found that when a mode of failure indicator is constructed and arranged as described in the preceding paragraphs, the indicator can be employed to determine whether failure of a line suspension insulator such as 13 occurred because of lightning striking the transmission line conductor 12, the tower 10 or overhead ground wire 14, or whether failure occurred because of the switching of equipment connected to the conductor 12. Operation of indicators in accord with our invention is based on the fact lightning strokes to the earth or to a transmission line are predominately negative (e.g. about 85% of the strokes are of such a polarity that the flow of negative charges is from the cloud toward the earth during the heavy return stroke). If such a lightning stroke contacts the transmission line conductor 12, a flash-over is very likely to occur at the nearest transmission tower. In such a case, the flow of current will be from the grounded transmission tower, down the insulator toward the phase conductor 12 as indicated by the arrow $L_1$ in FIGURE 1. However, if the lightning stroke hits a transmission tower or the overhead ground wire, the flow of current will be from the phase conductor, up the insulator towards the grounded tower as indicated by the arrow $L_2$. Thus, the polarity of the current flowing across the insulator during a flash-over is different when the lightning stroke hits the phase conductor than when the stroke hits the tower or overhead ground wire. The polarity and relative magnitude of the stroke can be indicated by the type and size of an image, such as a Lichtenberg figure, recorded by the image producing means 70. For example, when the tower is struck, a positive Lichtenberg figure having a configuration corresponding to that in FIGURE 6 will be produced on a recording medium 27. On the other hand, when the phase conductor is struck, a negative Lichtenberg figure having a configuration similar to that shown in FIGURE 7 will be produced.

The remaining possibility is a flash-over insulator failure caused by some fault other than lightning, such as switching of equipment connected to the transmission line conductor 12. Lightning strokes produce voltage surges that rise to a maximum crest in about 1 to 10 microseconds, while transmission line frequency voltage surges, such as during switching, rise to a maximum crest in roughly 4,000 microseconds. Therefore, when lightning-caused surges are compared with transmission line frequency surges, the lightning caused surges have very steep wave fronts and can be regarded as having a frequency of a much higher order of magnitude; it is to be understood of course that the lightning surges are uni-directional and therefore are not truly high frequency surges. Nevertheless, since lightning-caused surges behave as though they were of a frequency of a higher order of magnitude than transmission surges, mode of failure indicators can be constructed so that they filter-out or block low frequency surges and thus are sensitive only to the rapid rates of voltage rise of the lightning-caused surges.

In the embodiment of FIGURES 2–5, transmission line frequency surges are filtered-out by the combination of the gaps 57, the resistors 59, and other impedance producing elements, such as the turn to turn capacitance of the winding 52. Those skilled in the art will realize that these variables can be adjusted to predetermined values that will ensure that low frequency surges will be filtered out. Thus a low frequency surge will not produce a great enough potential difference between the point electrode 25 and plate 26 to expose the medium 27. A modification of a mode of failure indicator 20 that would also make the indicator insensitive to low frequency surges would be to employ a "high-pass" filter across the leads from the resistance means to the point electrode and plate. This would ensure that all voltages below the predetermined frequency that the filter will pass can not cause the recording medium to be exposed.

Thus, when a discoloration or other damage on the exterior of a transmission line insulator indicates that a failure has occurred, the cause of the failure can be determined by employing a mode of failure indicator in accordance with our invention. The shape of the image produced (e.g., a negative or positive Lichtenberg figure) will indicate whether the phase conductor, or the transmission tower or the overhead ground wire has been struck. A lack of actuation of the recording media will indicate that the failure occurred at a lower frequency and, hence, was caused by switching or other low frequency phenomena affecting the electric power transmitted through the phase conductor.

It has thus been shown that by employing the teachings of our invention, the cause of flash-over of a transmission line insulator can easily be determined. This enables a modification of the power transmission system to ensure that a failure from the same cause does not occur again. The particular embodiment of our invention illustrated in FIGS. 2–5 possesses the additional advantages of being a compact, portable, unitary device that can be applied to existing power transmission systems without requiring modification of such systems.

It will be understood, of course, that while the forms of the invention herein shown and described constitute preferred embodiments of the invention, it is not intended herein to illustrate all of the equivalent forms or ramifications thereof. For example, in addition to the illustrated embodiments in which a permanent image of an electrical impulse is produced on a recording medium, it is also contemplated that our invention is equally applicable to arrangements where a non-permanent image, such as that produced on an oscilloscope, is obtained; thus, an alternative embodiment would be to connect the leads from the image producing winding 24 and resistor 28 in FIGURE 1 to an oscilloscope or other wave form indicating means, and have an observer watch for an impulse that would indicate the direction of movement of a lightning stroke. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. In a mode of failure indicator for an elongate transmission line insulator assembly, an impulse current transformer having a magnetic core ring adapted for coaxial mounting upon said insulator assembly and including a secondary winding provided with a pair of output terminals, said transformer providing at said output terminals unidirectional high voltage impulses in response to steep wave front unidirectional current flashovers across said insulator and low voltage impulses in response to flashovers at power frequency, said high voltage impulses having opposite polarities characteristically related to flashovers in opposite directions across said insulator, and indicating means responsive only to said high voltage impulses for indicating the direction of a steep wave front flash-over.

2. In a mode of failure indicator for an elongate transmission line insulator assembly, an impulse current transformer having a toroidal magnetic core adapted for coaxial mounting upon said insulator assembly and including a secondary winding provided with a pair of output terminals, said transformer providing at said output terminals unidirectional high voltage impulses in response to steep wave front unidirectional current flash-overs across said insulator and low voltage impulses in response to flash-overs at power frequency, said high voltage impulses having opposite polarities characteristically related to flash-overs in opposite directions across said insulator, a resistor connected across said output terminals to render said impulses substantially proportional in magnitude to the magnitude of flash-over current, and indicating means connected across said resistor and responsive only to said high voltage impulses for indicating the direction of a steep wave front flash-over and distinguishing a power frequency flash-over by failure to indicate.

3. In a mode of failure indicator for an elongate transmission line insulator assembly, an impulse current transformer having a toroidal magnetic core adapted for coaxial mounting upon said insulator assembly and including a secondary winding provided with a pair of output terminals, said transformer providing at said output terminals unidirectional high voltage impulses in response to steep wave front unidirectional current flash-overs across said insulator and low voltage impulses in response to flash-overs at power frequency, said high voltage impulses having opposite polarities characteristically related to flash-overs in opposite directions across said insulator, and recording means responsive only to said high voltage impulses for making characteristically different permanent records of impulses of opposite polarity, whereby the existence of any such record indicates the occurrence and the direction of a steep wave front current flash-over.

4. In a mode of failure indicator for an elongate transmission line insulator assembly including a coaxial metal suspension rod and a connecting cap, an impulse current transformer having a toroidal magnetic core adapted for coaxial seating upon said cap and including a secondary winding provided with a pair of output terminals, said transformer providing at said output terminals unidirectional high voltage impulses in response to steep wave front unidirectional current flash-overs across said insulator and low voltage impulses in response to flash-overs at power frequency, and directional responsive recording means coupled to said output terminals and responsive only to said high voltage impulses whereby flash-over damage to said insulator may be identified as to cause by inspection of the recording means.

5. In a mode of failure indicator for an elongate transmission line insulator assembly including a coaxial metal suspension rod and a connecting cap, said insulator being of such a nature that current flash-over caused by voltage surges will visibly mark an exterior surface thereof, an impulse current transformer having a two-part hinged magnetic core ring adapted for coaxial positioning upon said connecting cap and including a secondary winding provided with output terminals, said transformer providing at said output terminals unidirectional high voltage impulses in response to steep wave front unidirectional current flash-overs across said insulator and low voltage impulses in response to flash-overs at power frequency, a resistor connected across said output terminals thereby to integrate said current impulses and provide across said resistor a voltage drop substantially proportional to the magnitude of a flash-over current across said insulator, a pair of fixedly spaced electrodes connected across said resistor, and a discharge pattern-forming medium disposed between said electrodes for creating characteristically different permanent visible images in response to high voltage impulses of opposite polarity, whereby the occurrence of a flash-over as indicated by inspection of said insulator may be distinguished as to cause and direction by inspection of said pattern-forming medium.

References Cited by the Examiner
UNITED STATES PATENTS

| | | | |
|---|---|---|---|
| 1,649,180 | 11/27 | Peters | 324—113 |
| 2,663,845 | 12/53 | Kock | 324—127 |
| 2,709,800 | 5/55 | Temple et al. | 340—253 |
| 2,802,175 | 8/57 | Eldridge | 324—54 |
| 2,200,233 | 5/60 | Whitehead | 317—61 XR |

OTHER REFERENCES

"Conveyorized Assembly for Component Embedment" by J. C. Souter; Electrical Manfacturing; August 1954; pages 89–93.

NEIL C. READ, *Primary Examiner.*

BENNETT G. MILLER, *Examiner.*